(12) United States Patent
Goto

(10) Patent No.: US 6,376,128 B1
(45) Date of Patent: Apr. 23, 2002

(54) SOLID ELECTROLYTE BATTERY HAVING REDUCED SIZED ELECTRODES

(75) Inventor: Shuji Goto, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/504,815

(22) Filed: Feb. 16, 2000

(30) Foreign Application Priority Data

Feb. 23, 1999 (JP) .......................................... P11-045325

(51) Int. Cl.$^7$ ................................................. H01M 6/18
(52) U.S. Cl. ......................... 429/304; 429/94; 429/127; 429/128; 429/162; 429/300
(58) Field of Search ........................ 429/94, 127, 128, 429/162, 300, 304

(56) References Cited

U.S. PATENT DOCUMENTS 5,770,331 A * 6/1998 Olsen et al. ................ 429/162
6,190,426 B1 * 2/2001 Thibault et al. ............ 29/623.2

* cited by examiner

Primary Examiner—Carol Chaney
Assistant Examiner—Dah-Wei Yuan
(74) Attorney, Agent, or Firm—Sonnenschein, Nath & Rosenthal

(57) ABSTRACT

A solid electrolyte battery having a high energy density and in which it is possible to prevent internal shorting. The solid electrolyte battery includes a positive electrode, a negative electrode arranged facing the positive electrode and a solid electrolyte layer formed on a surface of at least one of the positive and negative electrodes. The positive and negative electrodes are arranged with the solid electrolyte layer carrying sides facing each other. One of the positive and negative electrodes is smaller in size than the other electrode, while the solid electrolyte layer formed on the electrode smaller in size is formed so as to be larger than the electrode smaller in size.

9 Claims, 8 Drawing Sheets

SOLID ELECTROLYTE BATTERY HAVING REDUCED SIZED ELECTRODES

STATEMENT OF RELATED APPLICATIONS

This application claims priority to JP P11-045325, filed Feb. 23, 1999, the disclosure of which is expressly incorporated by reference to the extent permissible by law.

BACKGROUND OF THE INVENTION

1. Field of the Invention

This invention relates to a solid electrolyte battery in which a positive electrode and a negative electrode are layered together with the interposition of a solid electrolyte.

2. Description of the Prior Art

Recently, portable electronic equipments, such as camera built-in tape recorder, portable telephone or a notebook type personal computer, have made their debut, and attempts are being made to reduce their size or weight. The batteries, as portable power sources for these electronic equipments, are also required to be small in size and weight. As batteries capable of meeting this demand, lithium ion batteries have been developed and put to commercial use. In these lithium ion batteries, a porous high molecular separator, having an electrolytic solution immersed therein, is used as an ion conductor arranged between the positive and negative electrodes. The entire battery is packaged in a massive metal vessel in order to prevent leakage of the electrolytic solution.

On the other hand, with a solid electrolyte battery, having a solid electrolyte as an ion conductor between the positive and negative electrodes, and in which there is no fear of liquid leakage, reduction in size and weight of the battery may be expected to be realized by package simplification. In particular, a high molecular solid electrolyte, in which is solid-dissolved a lithium salt, or a gel-like solid electrolyte, containing an electrolytic solution in a matrix polymer, is attracting attention.

This solid electrolyte battery may be manufactured in a manner now explained. FIG. 1 shows a layered electrode assembly 5 comprised of positive electrodes 2 and negative electrodes 3 layered together with the interposition of solid electrolyte layers.

As for the positive electrode 2, a positive electrode mixture, containing an active material for the positive electrode, an electrifying agent and a binder, is coated evenly on both surfaces of a positive electrode current collector 2a and dried in situ to form active material layers 2b for the positive electrode. After drying, the resulting dried product is pressed by a roll press to produce a positive electrode sheet.

As for the negative electrode 3, a negative electrode mixture, containing an active material for the negative electrode and a binder, is coated evenly on both surfaces of a negative electrode current collector 3a and dried in situ to form active material layers 3b for the positive electrode. After drying, the resulting dried product is pressed by a roll press to produce a negative electrode sheet.

As for the solid electrolyte layers 12, a sol-like electrolytic solution, containing a non-aqueous solvent, an electrolyte salt and a matrix polymer, is evenly coated on both surfaces of the positive electrode sheet and the negative electrode sheet and dried in situ to remove the solvent. This forms the gel-like solid electrolyte layers 12 on the active material layers 2b for the positive electrode and on the active material layers 3b for the positive electrode.

The positive electrode sheet, now carrying the solid electrolyte layers 12, is sliced into e.g. rectangular strips. The portions of the solid electrolyte layers 12 and the active material layers 2b for the positive electrode which prove lead welding portions are then scraped off. In these portions, leads are welded to form the positive electrode 2 carrying the solid electrolyte layers 12.

The negative electrode sheet, now carrying the solid electrolyte layers 12, is sliced into e.g. rectangular strips. The portions of the solid electrolyte layers 12 and the active material layers 3b for the negative electrode which prove lead welding portions are then scraped off. In these portions, leads are welded to form the negative electrode 3 carrying the solid electrolyte layers 12.

Finally, the positive electrode 2 and the negative electrode 3, now carrying the solid electrolyte layers 12, are layered together to form the layered electrode assembly 5 shown in FIG. 1. This layered electrode assembly 5 is clinched by an external film and the outer rim portion of the external film is thermally fused under reduced pressure and sealed to encapsulate an electrode coil in the external film to complete the solid electrolyte battery.

In the above-described solid electrolyte battery, it is effective to reduce the thickness of the solid electrolyte layers 12 to improve the energy density. However, if the thickness of the solid electrolyte layers 12 is reduced, the solid electrolyte layers 12 are susceptible to breakage under an impact from outside, thus possibly leading to internal shorting. Thus, the thickness of the solid electrolyte layers 12 cannot be reduced to frustrate efforts in improving the energy density.

One of the reasons the internal shorting increases with the tendency towards a thinner thickness of the solid electrolyte layers 12 may be such that, with the conventional solid electrolyte battery, the ends of the positive electrode 2 and the negative electrode 3 are exposed at the ends of the layered electrode assembly 5, so that, when the layered electrode assembly 5 is to be hermetically sealed in the external film, an external pressure is applied to the layered electrode assembly 5, with the result that the end of the negative electrode 3 is bent at the end of the layered electrode assembly 5 to cause shorting thereof with the positive electrode 2. The thinner the thickness of the solid electrolyte layers 12, the smaller becomes the separation between the positive electrode 2 and the negative electrode 3 and hence the larger becomes the possibility of shorting.

Another problem caused by the thinner thickness of the solid electrolyte layers 12 is powder debris from the electrode surface. When layering the electrodes together, powders of the active material of the electrodes or of the metal collector descend to be clinched between the electrodes. If the solid electrolyte layers 12 are of reduced thickness, minute holes are produced in the solid electrolyte layers 12 to cause internal shorting. This powder debris occurs most outstandingly on the positive electrode 2.

SUMMARY OF THE INVENTION

It is therefore an object of the present invention to provide a solid electrolyte battery of high energy density in which internal shorting is prevented from occurring.

The present invention provides a solid electrolyte battery including a positive electrode, a negative electrode arranged facing said positive electrode and a solid electrolyte layer formed at least on at least one of the major surfaces of the positive and negative electrodes. The positive and negative electrodes are layered with the major surfaces thereof carrying the solid electrolyte layers facing each other. One of the positive and negative electrodes is smaller than the other of the positive and negative electrodes. The solid electrolyte layer formed on the smaller electrode is larger than the smaller electrode.

In the solid electrolyte battery according to the present invention, the solid electrolyte layers formed on the smaller one of the positive and negative electrodes is larger than the smaller electrode, the end of the smaller electrode is covered by the solid electrolyte layers to prevent the positive and negative electrodes from being contacted with each other at the electrode ends and consequent shorting.

Thus, with the present invention, internal shorting can be prevented from occurring despite reduced thickness of the solid electrolyte layers, thus realizing a superior solid electrolyte battery having a high energy density.

DESCRIPTION OF THE PREFERRED EMBODIMENTS

Figure 1:
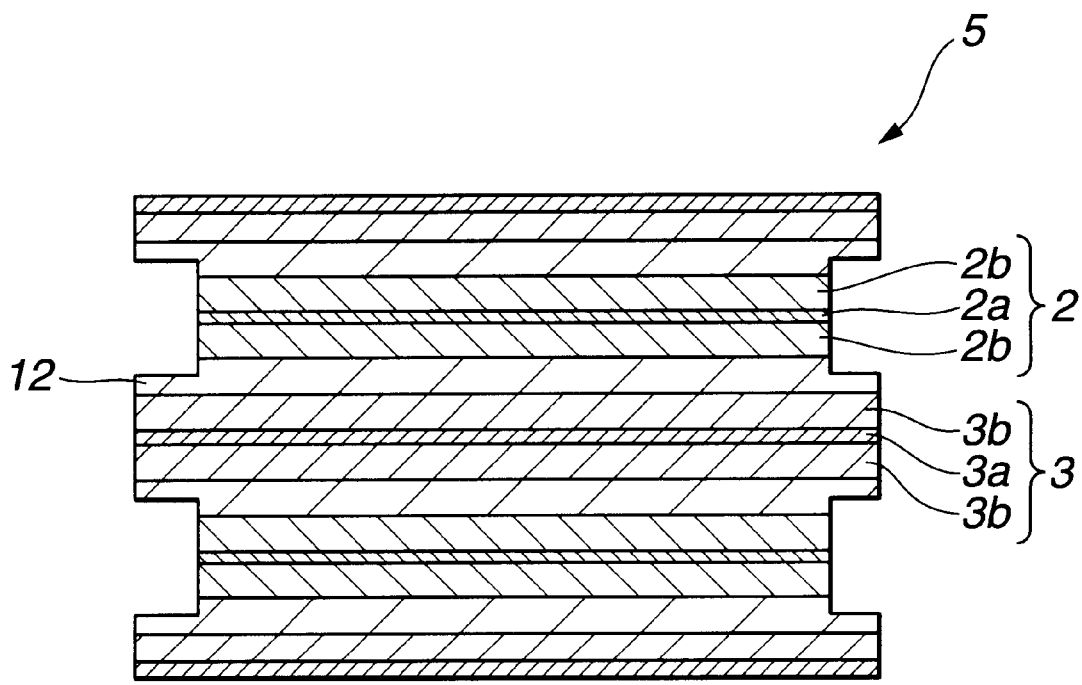
FIG. 1 is a cross-sectional view showing an illustrative structure of a conventional layered electrode assembly.

Referring to the drawings, preferred embodiments of according to the present invention will be explained in detail.

Figure 2:
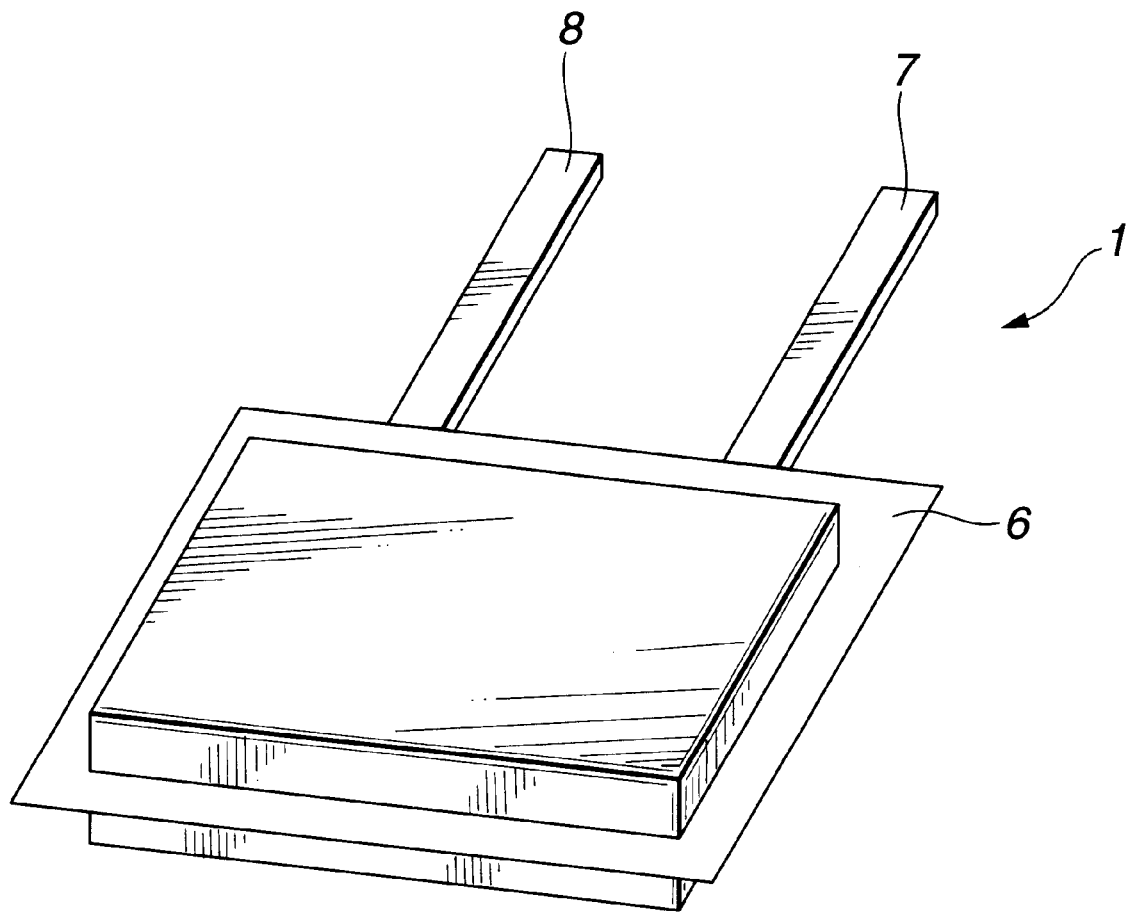
FIG. 2 is a perspective view showing an illustrative structure of a non-aqueous electrolyte battery according to the present invention.
Figure 3:
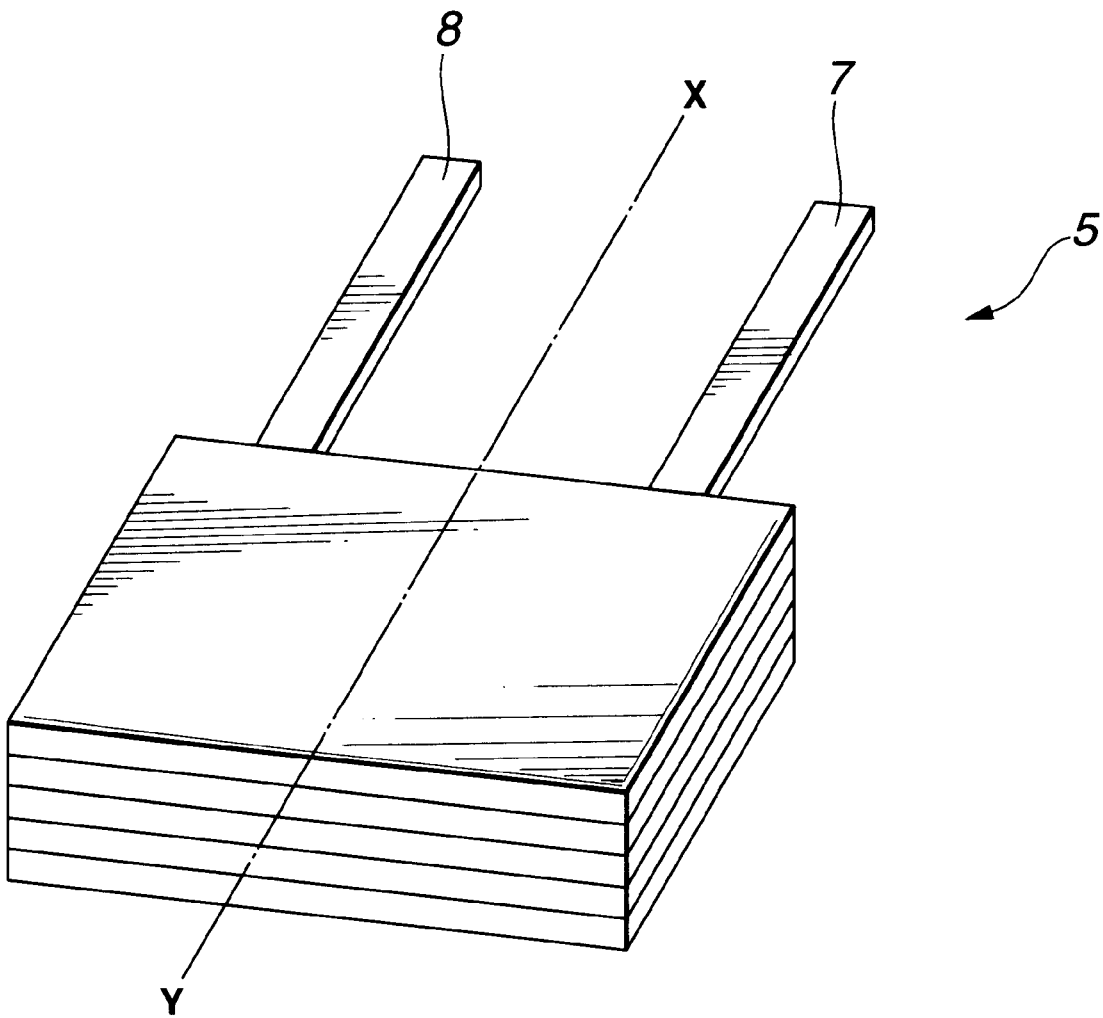
FIG. 3 is a perspective view showing an illustrative structure of a layered electrode assembly used in the non-aqueous solvent of FIG. 2.
Figure 4:
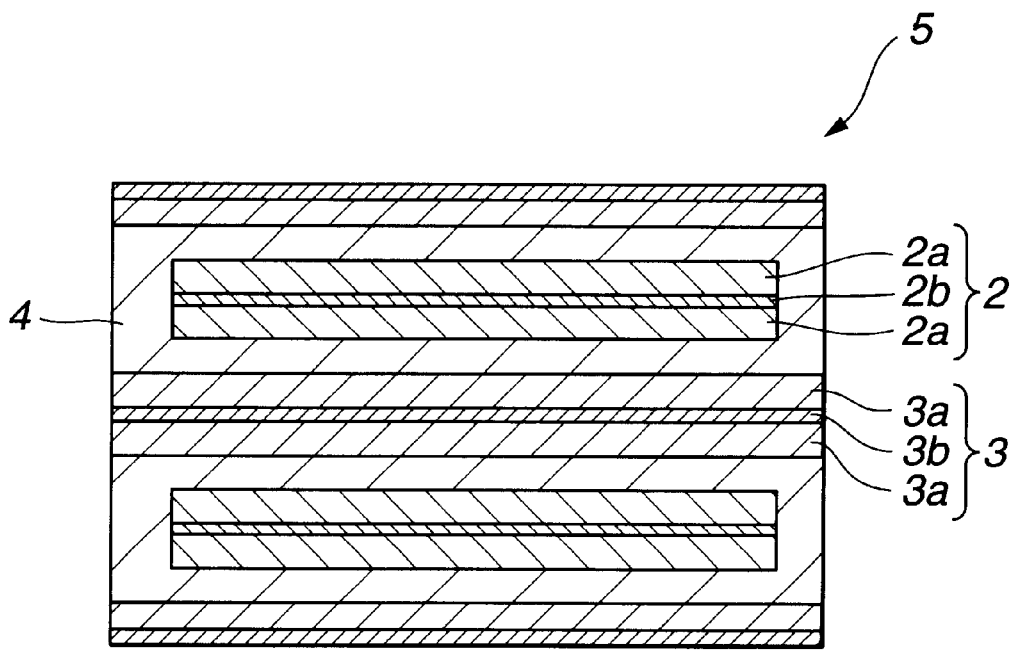
FIG. 4 is a cross-sectional view taken along line X-Y in FIG. 3.

FIGS. 2 to 4 show an illustrative structure of a gel electrolyte battery embodying the present invention. In this gel electrolyte battery, this gel electrolyte battery 1 is comprised of layered electrode assemblies 5, shown in FIGS. 3 and 4, sheathed and hermetically sealed by an external film 6 formed of an insulating material. Referring to FIGS. 3 and 4, this layered electrode assembly 5 is comprised of a plurality of sets each made up of a positive electrode 2, a negative electrode 3 arranged facing the positive electrode 2 and a gel electrolyte layer 4 arranged between the positive electrode 2 and the negative electrode 3. In this layered electrode assembly 5, plural positive electrodes 2 and plural negative electrodes 3 are layered together with the gel electrolyte layers 4 in-between. A positive electrode terminal 7 and a negative electrode terminal 8 are connected to the positive electrode 2 and the negative electrode 3, respectively. The positive electrode terminal 7 and the negative electrode terminal 8 are clinched in an sealed opening in a peripheral portion of the external film 6.

The active material layers $2a$ for the positive electrode 2 are formed on both surfaces of the positive electrode current collector $2b$, as shown in FIG. 4. The positive electrode current collector $2b$ may, for example, be a metal foil, such as an aluminum foil.

The active material for the positive electrode 2 may be complex oxides, such as lithium cobaltate, lithium nickelate or lithium manganate, these complex oxides partially replaced by other transition metals, transition metal compounds, such as manganese dioxide or vanadium pentoxide, and transition metal chalcogen compounds, such as iron sulfide.

In the negative electrode 3, active material layers $3a$ for the negative electrode 3 are formed on both surfaces of the negative electrode collector $3b$. The negative electrode collector $3b$ may, for example, be a metal foil, such as a copper foil.

As the active material for the negative electrode, such a material that is able to dope and undope lithium can be used. The material that is able to dope and undope lithium may be enumerated by pyrocarbon, cokes, carbon blacks such as acetylene black, carbon materials, such as graphite, vitreous carbon, activated charcoal, carbon fibers, organic high molecular sintered material, sintered coffee beans, sintered cellulose or sintered bamboo, and electrically conductive polymers, such as metal lithium, lithium alloys or polyacetylene.

The gel electrolyte layer 4 contains an electrolyte salt, a matrix polymer and a swelling solvent as a plasticizer.

As the electrolyte salt, $LiPF_6$, $LiAsF_6$, $LiBF_4$, $LiClO_4$, $LiCF_3SO_3$, $Li(CF_3SO_2)_2N$, $LiC_4F_9SO_3$, for example, may be used alone or in combination.

There is no limitation to the chemical structure of the matrix polymer if it exhibits ion conductivity not lower than 1 mS/cm at room temperature. The material of the matrix polymer may be enumerated by, for example, polyacrylonitrile, polyvinylidene fluoride, polytetrafluoroethylene, polyhexafluoroethylene, polyethylene oxide, polypropylene oxide, polyphosphasen, polysiloxane, polyvinyl acetate, polyvinyl alcohol, polymethyl methacrylate, polyacrylic acid, styrene-butadiene rubber, nitrile-butadiene rubber, polystyrene and polycarbonate.

As the swelling solvents, non-aqueous solvents, such as ethylene carbonate, propylene carbonate, butylene carbonate, γ-butyrolactone, γ-valerolactone, diethoxy ethane, tetrahydrofuran, 2-methyl tetrahydrofuran, 1,3-dioxan, methyl acetate, methyl propionate, dimethyl carbonate, diethyl carbonate or ethylmethyl carbonate, may be used, either singly or in combination.

Figure 5:
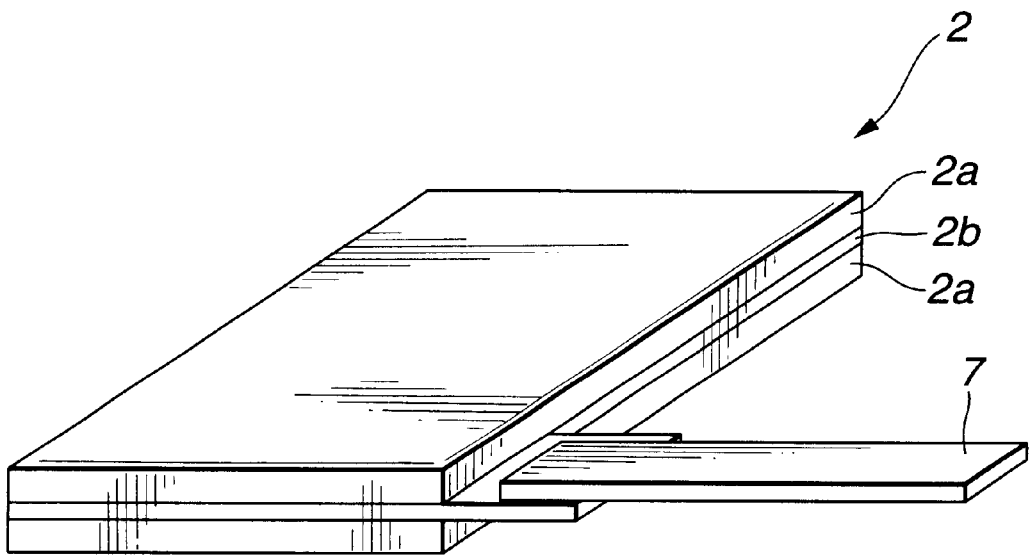
FIG. 5 is a perspective view showing an illustrative structure of a positive electrode.
Figure 6:
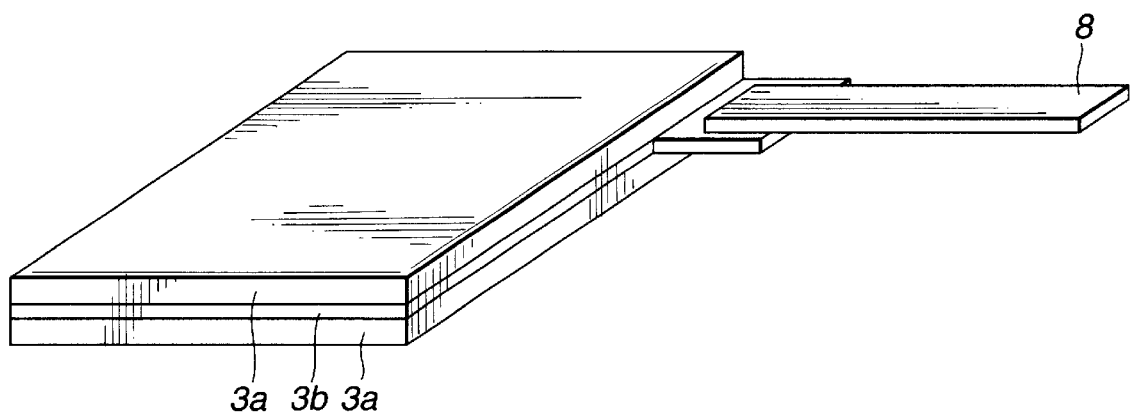
FIG. 6 is a perspective view showing an illustrative structure of a negative electrode.
Figure 7:
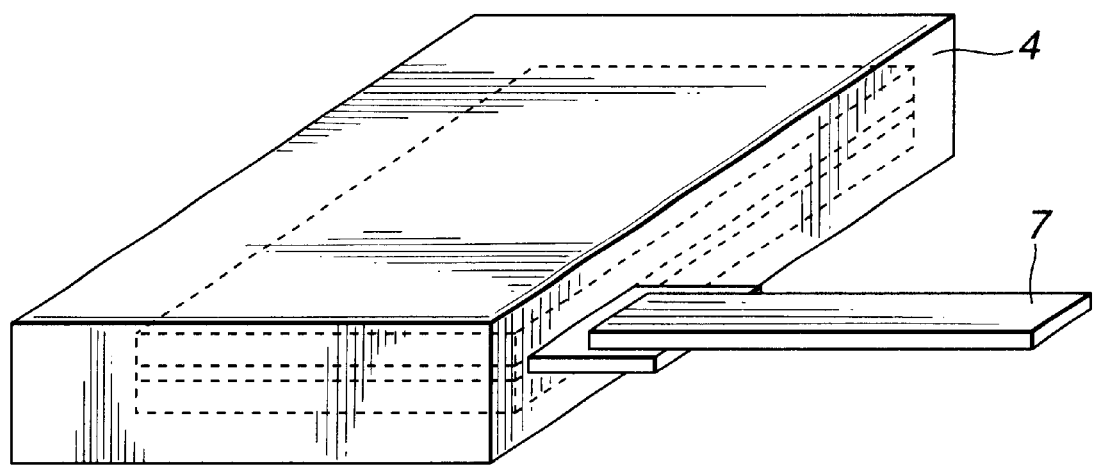
FIG. 7 is a perspective view showing the state in which solid electrolyte layers have been formed on a positive electrode of FIG. 5.
Figure 8:
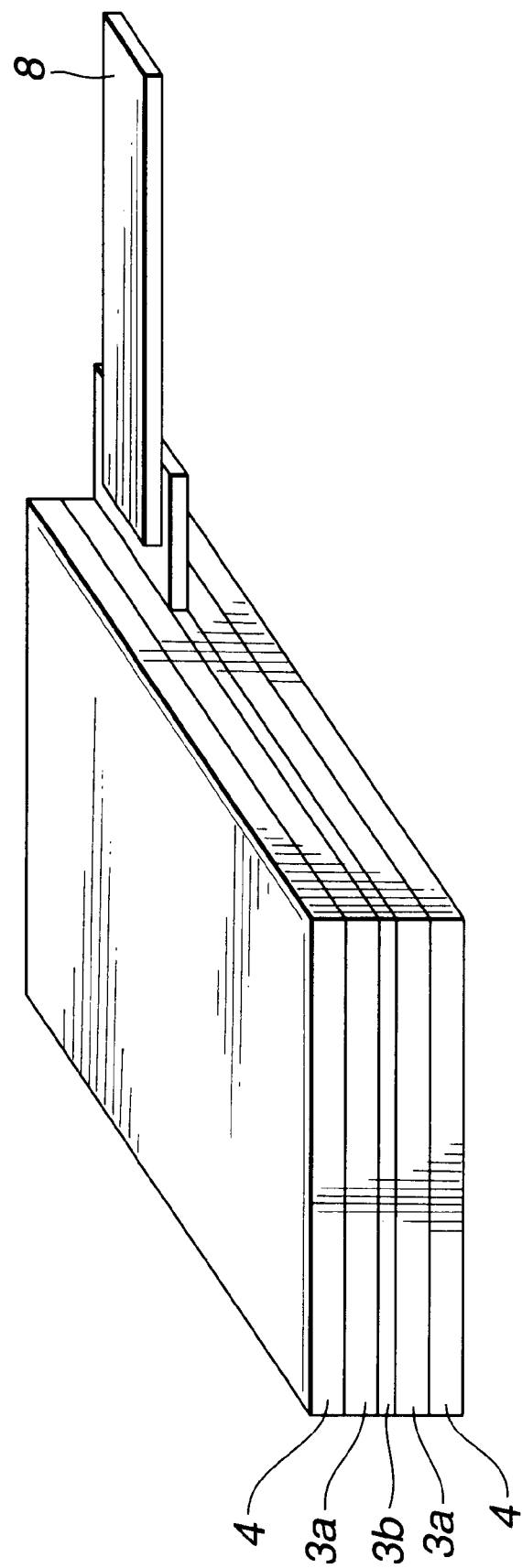
FIG. 8 is a cross-sectional views showing the state in which solid electrolyte layers have been formed on a positive electrode of FIG. 5.

In the gel electrolyte battery 1, according to the present invention, the positive electrode 2 is smaller in size than the negative electrode 3, as shown in FIGS. 5 and 6. On an active material layers $2a$ of the positive electrode 2, a gel electrolyte layer 4 larger in size than the positive electrode 2 is formed to overlie the positive electrode 2, as shown in FIG. 7. On the other hand, another gel electrolyte layer 4 is formed on an active material layer $3a$ of the negative electrode 3, as shown in FIG. 8.

The positive electrode 2 and the negative electrode 3, both carrying the gel electrolyte layers 4, are layered together via the gel electrolyte layer 4, as shown in FIGS. 3 and 4. Since the positive electrode 2 is encapsulated in the gel electrolyte layer 4, the positive electrode 2 is not exposed at an end of the layered electrode assembly 5 when the positive electrode 2 and the negative electrode 3 are assembled together as the layered electrode assembly 5.

Therefore, if, in this gel electrolyte battery 1, an external pressure is applied to the layered electrode assembly 5 when encapsulating the layered electrode assembly 5 in the external film 6, so that the end of the negative electrode 3 is warped, the negative electrode 3 and the positive electrode 2 are not contacted with each other because the end of the positive electrode 2 is sheathed by the gel electrolyte, thus decreasing the internal shorting appreciably.

In addition, in the present gel electrolyte battery 1, the ends of the positive electrode 2 are sheathed by the gel electrolyte to decrease internal shorting, as described above, it is possible to reduce the thickness of the gel electrolyte layer 4 between the positive electrode 2 and the negative electrode 3. Thus, with the present gel electrolyte battery 1, the spacing for the active material layers 2a of the positive electrode 2 or the active material layer 3a of the negative electrode 3 is increased in an amount corresponding to the decreased thickness of the gel electrolyte layer 4, thus enabling the energy density to be increased correspondingly.

Figure 9:
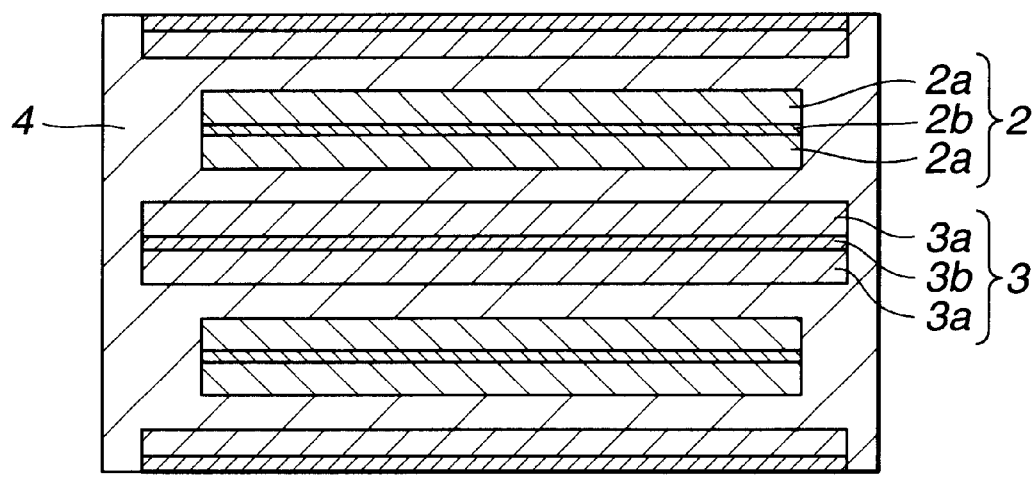
FIG. 9 is a perspective view showing another illustrative structure of the layered electrode assembly.
Figure 10:
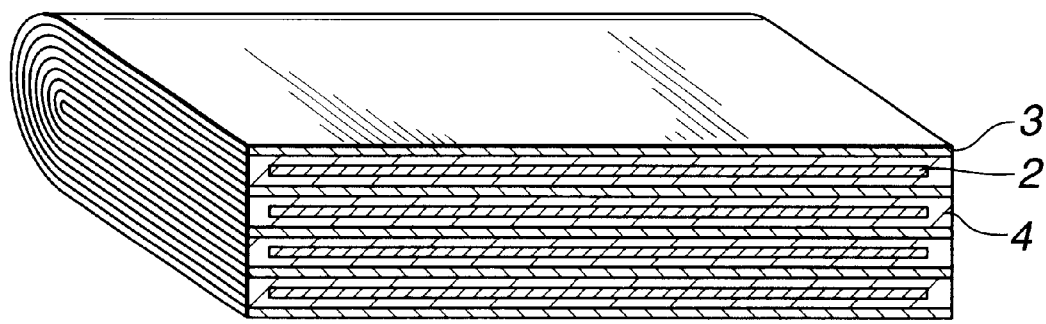
FIG. 10 is a perspective view showing an illustrative structure of an electrode coil comprised of positive and negative electrodes coiled together.

Also, in the present gel electrolyte battery 1, the gel electrolyte layer 4 formed on the active material layer 3a of the negative electrode 3 may be larger than the negative electrode 3 in size so as to sheathe the negative electrode 3, as shown in FIG. 9. By sheathing not only the end of the positive electrode 2 but also the end of the negative electrode 3 with the gel electrolyte, it is possible to prevent contact of the negative electrode 3 with the positive electrode 2 more completely to decrease the internal shorting more effectively. Moreover, by setting the gel electrolyte layer 4 so as to be larger in size than the negative electrode 3, it is possible to prevent powder debris of the active materials of the electrodes or the metal collector. This prevents powders of the active materials of the electrodes or the metal collector from being clinched during layering of the electrodes to eliminate internal shorting otherwise caused by the breakage of the gel electrolyte layer 4.

For preparing the positive electrode 2, a positive electrode mixture containing an active material layers of the positive electrode and a binder is evenly coated on a metal foil, such as an aluminum foil, which proves a positive electrode current collector 2b. The resulting assembly is dried in situ to prepare a positive electrode sheet carrying the active material layers 2a of the positive electrode. As the binder for the positive electrode mixture, any suitable known binder may be used. Alternatively, known adders may be added to the positive electrode mixture.

The positive electrode sheet then is sliced in a rectangular shape. The portion of the active material layers 2a of the positive electrode 2 to which is welded a lead of e.g., aluminum, is scraped off, and the aluminum lead is then welded thereat to serve as the positive electrode terminal 7. This gives the positive electrode 2.

The gel electrolyte layer 4 then is formed on the active material layers 2a of the positive electrode 2. For forming the gel electrolyte layer 4, an electrolyte salt is first dissolved in anon-aqueous solvent to prepare a non-aqueous electrolytic solution. This non-aqueous electrolytic solution is added to with a matrix polymer and stirred thoroughly to dissolve the matrix polymer to obtain a sol-like electrolytic solution.

This electrolytic solution then is evenly coated on the positive electrode 2 placed on a planar glass sheet. At this time, the electrolytic solution is coated not only on the active material layers 2a of the positive electrode 2 but also on the portion on the glass sheet outside the active material layers 2a. The resulting assembly then is cooled to room temperature to gel the matrix polymer to form the gel electrolyte layer 4 on the active material layers 2a. This positive electrode 2 then is turned upside down to coat the electrolytic solution in a similar manner on the opposite side active material layers 2a. The resulting assembly then is dried in situ. This forms gel electrolyte layers 4 on both sides of the positive electrode 2.

The gel electrolyte layers 4 then are cut off so that the gel electrolyte layers 4 will be protruded by e.g., 1 mm outwardly of the respective ends of the positive electrode 2. This gives the positive electrode 2 having the gel electrolyte layers 4 extending a pre-set width from the ends of the active material layers 2a of the positive electrode 2.

For preparing the negative electrode 3, a negative electrode mixture containing the active material layer 3a of the negative electrode 3 and the binder is evenly coated on a metal foil, such as a copper foil, which proves the negative electrode collector 3b, to give a negative electrode sheet carrying the active material layer 3a of the negative electrode 3. As the binder for the negative electrode mixture, any suitable known binder may be used. Alternatively, known adders may be added to the negative electrode mixture.

The gel electrolyte layer 4 then is formed on the active material layer 3a of the negative electrode 3 of the negative electrode sheet. For preparing the gel electrolyte layer 4, a pre-set amount of the electrolytic solution, prepared as described above, is coated on the negative electrode collector 3b. The resulting product is then cooled at room temperature to gel the matrix polymer to form the gel electrolyte layer 4 on the active material layer 3a of the negative electrode 3.

The negative electrode sheet, carrying the gel electrolyte layer 4, is then sliced in a rectangular shape. The portion of the active material layers 3a and the gel electrolyte layer 4, to which is welded a lead of e.g., aluminum, is scraped off, and the aluminum lead is then welded thereat to serve as the negative electrode terminal 8. This gives the negative electrode 3 carrying the gel electrolyte layer 4.

The positive electrode 2 and the negative electrode 3, prepared as described above, are bonded together, with the sides thereof carrying the gel electrolyte layers 4 facing each other, and pressed together to give a layered electrode assembly 5.

Finally, the layered electrode assembly 5 is encapsulated in the external film 6 formed of an insulating material, and the positive electrode terminal 7 and the negative electrode terminal 8 are clinched in a sealing opening to complete the gel electrolyte battery 1.

In the above-described embodiment, the rectangular positive electrode 2 and the rectangular negative electrode 3 are layered together to form a layered electrode assembly 5. The present invention is, however, not limited to this configuration, and may be applied to a configuration in which the strip-shaped positive electrode 2 and the strip-shaped negative electrode 3 are layered together to form a layered electrode assembly, which electrode assembly then is coiled in the longitudinal direction to form an electrode coil.

The gel electrolyte battery 1 of the present embodiment may be cylindrically-shaped or square-shaped, without any limitations. Also, the present invention may be of variable sizes, such as thin type or of a large size type.

Also, in the above-described embodiment, the solid electrolyte battery is a gel electrolyte battery 1 containing a swelling solvent and employing a gel-like solid electrolyte. The present invention, however, is not limited to this configuration and may be applied to a solid electrolyte battery employing a solid electrolyte not containing the swelling solvent. The present invention is also applicable to both the primary and secondary batteries.

EXAMPLE

For confirming the advantageous effect of the present invention, a gel electrolyte battery was prepared and its characteristics were evaluated.

Example 1

First, a positive electrode was fabricated as follows:

In preparing the positive electrode, 0.5 mol of lithium carbonate and 1 mol of cobalt carbonate were mixed together and sintered in air at 900° C. for five hours to prepare $LiCoO_2$ which proves an active material layers of the positive electrode. 91 parts by weight of $LiCoO_2$, 6 parts by weight of graphite as an electrifying agent and 3 parts by weight of polyvinylidene fluoride as a binder were mixed together and dispersed in N-methyl pyrrolidone to form a slurry, which slurry was evenly coated on both surfaces of the positive electrode collector formed by an aluminum foil 20 μm in thickness and was dried in situ to form an active material layers of the positive electrode. The dried assembly was pressed in a roll press to give a positive electrode sheet. The density of the active material layers of the positive electrode was 3.6 $g/cm^3$.

The positive electrode sheet, prepared as described above, was sliced to give a shape having a 30 mm by 50 mm portion and a 5 mm by 5 mm lead welding portion. The active material layer of the positive electrode of the lead welding portion was scraped off and an aluminum lead was welded thereat to form a positive electrode terminal to produce a positive electrode.

On the positive electrode, prepared as described above, a gel electrolyte layer was formed. For forming the gel electrolyte layer 4, 42.5 parts by weight of ethylene carbonate, 42.5 parts by weight of propylene carbonate and 15 parts by weight of $LiPF_6$ were mixed together to give a plasticizer. 30 parts by weight of this plasticizer, 10 parts by weight of a vinylidene fluoride/hexafluoro propylene copolymer at a polymerization rate of 97:3, as a matrix polymer, and 60 parts by weight of tetrahydrofuran, were mixed together and dissolved to give a sol-like electrolytic solution.

This electrolytic solution then was evenly coated on the positive electrode placed on the flat glass sheet. At this time, the electrolytic solution was coated not only on the positive electrode but also on the glass sheet portion lying outside the positive electrode. The resulting assembly then was dried to remove tetrahydrofuran. The positive electrode then was turned upside down and the electrolytic solution was coated in similar manner on the opposite surface of the positive electrode. The resulting assembly then was dried. In this manner, gel electrolyte layers, each 12.5 μm thick, were formed on both surfaces of the positive electrode.

The gel electrolyte layers 4 then were cut off so that the gel electrolyte layers 4 will be protruded by e.g., 1 mm outwardly of the respective ends of the positive electrode 2. In this manner, a positive electrode was obtained in which the portions of the surfaces of the positive electrode 1 mm outside of the ends of the active material layers of the positive electrode are coated with the gel electrolyte layers.

The negative electrode was prepared as follows.

In preparing the negative electrode, 90 parts by weight of graphite and 10 parts by weight of polyvinylidene fluoride were mixed together and dispersed in N-methyl pyrrolidone to form a slurry, which slurry was evenly coated on both surfaces of the negative electrode collector formed by a copper foil 10 μm in thickness to form an active material layers of the negative electrode. The resulting assembly was dried in situ and pressed by a roll press to give a negative electrode sheet. The density of the active material layer of the negative electrode was 1.6 $g/cm^3$.

Then, gel electrolyte layers were formed on a negative electrode sheet. For forming the gel electrolyte layers, the electrolytic solution, prepared as described above, was evenly coated on both surfaces of the negative electrode sheet and dried in situ to remove tetrahydrofuran. In this manner, gel electrolyte layers, 12.5 μm in thickness, were formed on the active material layers of the negative electrode.

The negative electrode sheet, prepared as described above, was sliced to give a shape having a 32 mm by 52 mm portion and a 5 mm by 5 mm lead welding portion. The gel electrolyte layer and the active material layer of the negative electrode of the lead welding portion was scraped off and a nickel lead was welded thereat to form a negative electrode terminal to produce a negative electrode.

Then, plural positive electrodes, carrying gel electrolyte layers on both sides, and plural negative electrodes, similarly carrying gel electrolyte layers on both sides, were layered in the sequence of the negative electrode, positive electrode, negative electrode, positive electrode and the negative electrode, to form a layered electrode assembly.

Finally, this layered electrode assembly was clinched by an external film, comprised of a nylon layer 25 μm thick, an aluminum layer 40 μm thick and a polypropylene film 30 μm thick, layered together in this order from the outermost layer, and an outer rim edge of the external film was thermally fused and sealed under reduced pressure to encapsulate the layered electrode assembly in the external film. At this time, the positive electrode terminal and the negative electrode terminal were clinched in a sealing opening in the external film. This completed the gel electrolyte battery.

Comparative Example 1

A gel electrolyte battery was prepared in the same way as in Example 1, except fabricating the positive electrode as follows:

First, a positive electrode sheet and an electrolytic solution were prepared in the same way as in Example above.

Then, gel electrolyte layers were formed on the positive electrode sheet. For forming the gel electrolyte layers, an electrolytic solution was evenly coated on both surfaces of the positive electrode sheet and dried in situ to remove tetrahydrofuran to form the gel electrolyte layers, 12.5 μm thick, on both surfaces of the positive electrode sheet.

The positive electrode sheet, carrying the gel electrolyte layers, was sliced to give a shape having a 30 mm by 50 mm portion and a 5 mm by 5 mm lead welding portion. The gel electrolyte layers and the active material layer of the positive electrode of the lead welding portion were scraped off and an aluminum lead was welded thereat to form a positive electrode carrying gel electrolyte layers each 12.5 μm thick on both sides.

Comparative Example 2

A gel electrolyte battery was prepared in the same way as in Comparative Example 1 except setting the thickness of the gel electrolyte layers on the positive electrode and the negative electrode to 50 μm.

Comparative Example 3

A gel electrolyte battery was prepared in the same way as in Comparative Example 1 except setting the thickness of the gel electrolyte layers on the positive electrode and the negative electrode to 100 μm.

In the Example 2 and in the Comparative Examples 4 to 6, now explained, strip-shaped positive and negative electrodes were layered together and coiled longitudinally to form an electrode coil from which a battery was fabricated.

Example 2

First, a positive electrode sheet, a negative electrode sheet and an electrolytic solution were prepared in the same way as in Example 1.

The positive electrode sheet, carrying the gel electrolyte layers, was sliced to give a shape having a 50 mm by 260 mm portion and a 50 mm by 5 mm lead welding portion. The active material layer of the positive electrode of the lead welding portion was scraped off and a lead was welded thereat to form a positive electrode terminal to fabricate a positive electrode.

On the positive electrode, fabricated as described above, gel electrolyte layers were formed. For forming the gel electrolyte layers, the electrolytic solution was evenly coated on the positive electrode placed on a flat glass sheet. At this time, the electrolytic solution was coated not only on the positive electrode but also on the glass sheet portion lying outside the positive electrode. The resulting assembly then was dried in situ to remove tetrahydrofuran. The positive electrode then was turned upside down and the electrolytic solution was coated in similar manner on the opposite surface of the positive electrode. The resulting assembly then was dried. In this manner, gel electrolyte layers, each 12.5 μm thick, were formed on both surfaces of the positive electrode.

The gel electrolyte layers 4 then were cut off so that the gel electrolyte layers 4 will be protruded by e.g., 1 mm outwardly of the respective ends of the positive electrode 2 to give a positive electrode in which the portions within 12.5 μm on the surfaces of the positive electrode 1 mm outside of the ends of the active material layers of the positive electrode are coated with the negative electrode 2 gel electrolyte layers.

On the other hand, gel electrolyte layers were formed on the negative electrode sheet. This negative electrode sheet was sliced to give a shape having a 22 mm by 300 mm portion and a 52 mm by 5 mm lead welding portion. The gel electrolyte layer and the active material layer of the negative electrode of the lead welding portion were scraped off and a nickel lead was welded thereat to form a negative electrode terminal to produce a negative electrode.

The strip-shaped positive and negative electrodes, prepared as described above, respectively carrying gel electrolyte layers on both sides thereof, were layered together to form a layered assembly, which then was coiled longitudinally to form an electrode coil.

This electrode coil was clinched by an external film, comprised of a nylon layer 25 μm thick, an aluminum layer 40 μm thick and a propylene film 30 μm thick, layered in this order from the outermost layer, and an outer rim of the external film was thermally fused under a reduced pressure to seal the opening to encapsulate the electrode coil in the external film. At this time, the positive electrode terminal and the negative electrode terminal were clinched in the sealing, opening in the external film to complete a gel electrolyte battery.

Comparative Example 4

A gel electrolyte battery was fabricated in the same way as in Example 2 except that the following method was used for fabricating the positive electrode.

First, a positive electrode sheet and a negative electrode sheet were prepared in the same way as in Example 1.

Then, gel electrolyte layers were formed on the positive electrode sheet. For forming the gel electrolyte layers, an electrolytic solution was evenly coated on both sides of the positive electrode sheet and dried in situ to remove tetrahydrofuran to form gel electrolyte layers, each 12.5 μm thick, on the active material layer of the positive electrode.

The positive electrode sheet, carrying the gel electrolyte layers, was sliced to give a shape having a 50 mm by 260 mm portion and a 50 mm by 5 mm lead welding portion. The gel electrolyte layers and the active material layer of the positive electrode of the lead welding portion were scraped off and an aluminum lead was welded thereat to form a positive electrode carrying gel electrolyte layers each 12.5 μm thick on both sides.

Comparative Example 5

A gel electrolyte battery was prepared in the same way as in Comparative Example 4 except setting the thickness of the gel electrolyte layers on the positive electrode and the negative electrode to 50 μm.

Comparative Example 6

A gel electrolyte battery was prepared in the same way as in Comparative Example 4 except setting the thickness of the gel electrolyte layers on the positive electrode and the negative electrode to 100 μm.

Of the gel electrolyte batteries of the Examples 1 and 2 and Comparative Examples 1 to 6, prepared as described above, the rate of occurrence of the internal shorting and the energy density were measured. Meanwhile, the measurements were made of 50 each of the respective Examples and the Comparative Examples. The energy density is an average value of 50 batteries excluding leads or exterior portions.

The rates of occurrence of internal shorting and the energy density, as measured of the gel electrolyte batteries of the Examples 1 and 2 and Comparative Examples 1 to 6, are shown in Table 1:

TABLE 1

|  | rates of occurrence of internal shorting (%) | energy density (Wh/l) |
| --- | --- | --- |
| Ex.1 | 2 | 347.2 |
| Ex.2 | 6 | 444.5 |
| Comp. Ex.1 | 100 | 347.2 |
| Comp. Ex.2 | 46 | 223.2 |
| Comp. Ex.3 | 4 | 151.2 |
| Comp. Ex.4 | 100 | 444.5 |
| Comp. Ex.5 | 38 | 283.0 |
| Comp. Ex.6 | 8 | 189.4 |

It is seen from Table 1 that, with the battery of Ex. 1, the energy density is higher and the rates of occurrence of internal shorting is lower than with the batteries of Comparative Examples 1 to 3. It is also seen that, with the battery of Ex. 2, in which the positive and negative electrodes are formed into an electrode coil, the energy density is higher and the rates of occurrence of internal shorting is lower than with the batteries of Comparative Examples 4 to 6.

It has been seen that, by having the positive electrode sheathed by the gel electrolyte, contact between the negative and positive electrodes can be prohibited to reduce the internal shorting appreciably. Moreover, since the internal shorting can be decreased by having the positive electrode sheathed by the gel electrolyte, the thickness of the gel between the positive and negative electrodes can be reduced to improve the energy density.

What is claimed is:

1. A solid electrolyte battery comprising:

a positive electrode;

a negative electrode arranged facing said positive electrode; and a solid electrolyte layer formed at least on at least one of the major surfaces of said positive and negative electrodes;

said positive and negative electrodes being layered with the major surfaces thereof carrying said solid electrolyte layers facing each other;

one of said positive and negative electrodes being smaller than the other of said positive and negative electrodes, said solid electrolyte layer formed on said smaller electrode being larger than said smaller electrode; and wherein said positive electrode is smaller in size than said negative electrode.

2. The solid electrolyte battery according to claim 1 wherein said solid electrolyte layer formed on said positive electrode is of the same size as said solid electrolyte layers formed on said negative electrode.

3. The solid electrolyte battery according to claim 1 wherein said positive electrode is sheathed by said solid electrolyte layer.

4. The solid electrolyte battery according to claim 1 wherein said positive electrode and said negative electrode are both strip-shaped and are coiled in the longitudinal direction in the layered state.

5. The solid electrolyte battery according to claim 1 wherein said solid electrolyte layer contains a swelling solvent and gelled.

6. A solid electrolyte battery comprising:

a positive electrode;

a negative electrode arranged facing the positive electrode; and a solid electrolyte layer formed at least on at least one of the major surfaces of the positive and negative electrodes;

the positive and negative electrodes being layered with the major surfaces thereof carrying the solid electrolyte layers facing each other;

one of the positive and negative electrodes being smaller than the other of the positive and negative electrodes, the solid electrolyte layer formed on the smaller electrode being larger than the smaller electrode;

wherein the positive electrode is smaller in size than the negative electrode;

wherein the positive electrode is sheathed by the solid electrolyte layer.

7. The solid electrolyte battery according to claim 6 wherein the solid electrolyte layer formed on the positive electrode is of the same size as the solid electrolyte layers formed on the negative electrode.

8. The solid electrolyte battery according to claim 6 wherein the positive electrode and the negative electrode are both strip-shaped and are coiled in the longitudinal direction in the layered state.

9. The solid electrolyte battery according to claim 6 wherein the solid electrolyte layer contains a swelling solvent and gelled.

* * * * *